(12) United States Patent
Shin et al.

(10) Patent No.: US 9,633,185 B2
(45) Date of Patent: Apr. 25, 2017

(54) DEVICE HAVING SECURE JTAG AND DEBUGGING METHOD FOR THE SAME

(71) Applicant: SAMSUNG ELECTRONICS CO., LTD., Suwon-si (KR)

(72) Inventors: Jonghoon Shin, Hwaseong-si (KR); KyoungMoon Ahn, Seoul (KR); Mijung Noh, Yongin-si (KR); Yong Ki Lee, Yongin-si (KR); Sun-Soo Shin, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 15 days.

(21) Appl. No.: 14/556,397

(22) Filed: Dec. 1, 2014

(65) Prior Publication Data

US 2015/0242606 A1    Aug. 27, 2015

(30) Foreign Application Priority Data

Feb. 24, 2014    (KR) .......................... 10-2014-0021438

(51) Int. Cl.
| | | |
|---|---|---|
| *G06F 21/00* | (2013.01) | |
| *G06F 21/31* | (2013.01) | |
| *G06F 21/60* | (2013.01) | |
| *G01R 31/3185* | (2006.01) | |

(52) U.S. Cl.
CPC ..... *G06F 21/31* (2013.01); *G01R 31/318588* (2013.01); *G06F 21/602* (2013.01)

(58) Field of Classification Search
CPC .................................. G06F 21/31; H04L 63/08
USPC ......................................................... 713/182
See application file for complete search history.

(56) References Cited

U.S. PATENT DOCUMENTS

| | | | |
|---|---|---|---|
| 7,334,173 | B2 | 2/2008 | Morgan et al. |
| 7,345,502 | B1 | 3/2008 | Lakkapragada et al. |
| 7,363,564 | B2 | 4/2008 | Moss et al. |
| 7,600,166 | B1 | 10/2009 | Dunn et al. |
| 7,634,701 | B2 | 12/2009 | Morgan et al. |
| 7,715,884 | B2 | 5/2010 | Book et al. |

(Continued)

FOREIGN PATENT DOCUMENTS

| | | |
|---|---|---|
| CA | 2564021 A1 | 4/2007 |
| EP | 0175654 A2 | 3/1986 |

(Continued)

OTHER PUBLICATIONS

William M. Daley, "Entity Authentication Using Public Key Cryptography", Federal Information Processing Standards Publication, U.S. Department of Commerce / National Institute of Standards and Technology, Feb. 18, 1997, total 52 pages, FIPS PUB 196.

*Primary Examiner* — Anthony Brown
(74) *Attorney, Agent, or Firm* — Sughrue Mion, PLLC

(57) ABSTRACT

A method of debugging a device which includes a plurality of processors is provided. The method includes verifying a request to initiate authentication that is provided to the device to a user; performing a challenge-response authentication operation between the user and the device in response to the request to initiate authentication being a request from a non-malicious user; activating or deactivating an access to a Joint Test Action Group (JTAG) port of each of the processors, based on access control information from the user; and permitting a debugging operation via an access that is activated.

21 Claims, 17 Drawing Sheets

(56) References Cited

U.S. PATENT DOCUMENTS

| | | |
|---|---|---|
| 7,810,002 B2 | 10/2010 | Dunn et al. |
| 7,844,997 B2 | 11/2010 | Tucker et al. |
| 7,886,150 B2 | 2/2011 | Stollon et al. |
| 8,032,187 B2 | 10/2011 | Book et al. |
| 8,056,142 B2 | 11/2011 | Youm et al. |
| 8,065,517 B2 | 11/2011 | Cizas et al. |
| 8,214,630 B2 | 7/2012 | Peterka et al. |
| 8,255,578 B2 | 8/2012 | Maietta |
| 8,280,454 B2 | 10/2012 | Book et al. |
| 8,291,491 B2 | 10/2012 | Lee et al. |
| 8,332,641 B2 | 12/2012 | Case et al. |
| 8,347,116 B2 | 1/2013 | Youm et al. |
| 8,356,361 B2 * | 1/2013 | Werner ............... G06F 12/1433 709/225 |
| 8,489,888 B2 | 7/2013 | Lim |
| 8,554,284 B2 | 10/2013 | Book et al. |
| 2007/0022341 A1 | 1/2007 | Morgan et al. |
| 2007/0033454 A1 | 2/2007 | Moss et al. |
| 2007/0123303 A1 | 5/2007 | Book et al. |
| 2007/0162759 A1 * | 7/2007 | Buskey ............... G06F 11/3656 713/182 |
| 2007/0162956 A1 | 7/2007 | Tucker et al. |
| 2008/0148118 A1 | 6/2008 | Morgan et al. |
| 2008/0282087 A1 | 11/2008 | Stollon et al. |
| 2009/0172392 A1 | 7/2009 | Cizas et al. |
| 2009/0204823 A1 | 8/2009 | Giordano et al. |
| 2009/0228711 A1 | 9/2009 | Lim |
| 2009/0228977 A1 | 9/2009 | Lee et al. |
| 2009/0228981 A1 | 9/2009 | Shirlen et al. |
| 2009/0282254 A1 | 11/2009 | Wheller et al. |
| 2009/0307546 A1 | 12/2009 | Dunn et al. |
| 2010/0031026 A1 | 2/2010 | Cizas et al. |
| 2010/0153797 A1 | 6/2010 | Youm et al. |
| 2010/0178961 A1 | 7/2010 | Book et al. |
| 2010/0199077 A1 | 8/2010 | Case et al. |
| 2010/0217964 A1 | 8/2010 | Peterka et al. |
| 2010/0328074 A1 | 12/2010 | Johnson et al. |
| 2010/0332783 A1 | 12/2010 | Youm et al. |
| 2011/0307633 A1 | 12/2011 | Maietta |
| 2012/0021807 A1 | 1/2012 | Book et al. |
| 2012/0060067 A1 | 3/2012 | Youm et al. |
| 2012/0178961 A1 | 7/2012 | Sanders et al. |
| 2012/0315959 A1 | 12/2012 | Book et al. |
| 2013/0205370 A1 | 8/2013 | Kalgi et al. |

FOREIGN PATENT DOCUMENTS

| | | |
|---|---|---|
| EP | 2056228 A1 | 5/2009 |
| EP | 2056231 A1 | 5/2009 |
| WO | 2013/119739 A1 | 8/2013 |

* cited by examiner

DEVICE HAVING SECURE JTAG AND DEBUGGING METHOD FOR THE SAME

CROSS-REFERENCE TO RELATED APPLICATIONS

This application claims priority from Korean Patent Application No. 10-2014-0021438 filed Feb. 24, 2014, the entire contents of which are hereby incorporated by reference.

BACKGROUND

1. Field

Apparatuses and methods consistent with the present disclosure relate to a device having a secure debugging circuit and a debugging method of the same.

2. Description of Related Art

In recent years, malicious users have increased attacks on products that include Application Processors (APs). These malicious users have used an attach technique to gain malicious access to an AP. Thus, in response, a secure level of the AP product has been reinforced. In particular, there is research on a secure debugging circuit (hereinafter, referred to as "Secure JTAG") provided through a Joint Test Action Group (JTAG) port, because the JTAG port provides high controllability and observability on an AP chip. Secure JTAG authentication is divided into password authentication and challenge-response authentication.

The password authentication is prone to a replay attack, and it is easily exposed to a dictionary attack if the complexity of the password is low. Also, since a user knows the password, it is difficult to prevent a password from being exposed to a malicious user. In case of the password authentication, it is difficult to provide multiple, different access controls. Moreover, in many cases, different passwords are assigned to access controls, respectively. Therefore, even though the number of passwords may be reduced through a hierarchical structure, a plurality of passwords are required. In the case of a plurality of passwords, password management is difficult, and comparison with each password is required at authentication. Thus, a time for authentication may increase with the increase in the number of passwords.

In case of the challenge-response authentication, a request for executing an authentication protocol is simply to set an open signal. This may mean that the authentication protocol can be executed by any aggressor.

SUMMARY

According to an aspect of an exemplary embodiment, there is provided a method of debugging a device which includes a plurality of processors, the method including verifying a request to initiate authentication that is provided to the device; performing a challenge-response authentication operation between the user and the device in response to the request to initiate authentication being a request from a non-malicious user; activating or deactivating an access to a Joint Test Action Group (JTAG) port of each of the processors, based on access control information from the user; and permitting a debugging operation via an access that is activated.

The method may further include receiving a request for a device identifier (ID) from the user; and transmitting the device ID to the user, wherein the request to initiate authentication received from the user includes request information generated by a response server as a result of authentication of the user and the device ID by the response server.

The request information may include a public key of the response server.

The request information may include a hash value that is shared between the device and the response server.

The method may further include terminating the debugging operation when the request to initiate authentication is a request from a malicious user.

The performing the challenge-response authentication operation may include generating a challenge using a random number; and transmitting the challenge to the user.

The response server may receive the challenge and access control information from the user, and the response server may determine whether the access control information of the user is valid, generates the response, and transmits the generated response to the user.

The performing the challenge-response authentication operation may include receiving, at the device, the response from the response server and the access control information, from the user.

In some exemplary embodiments, the access control information comprises bus access control information indicating whether to access a bus when a debugging operation is performed.

The access control information may include memory access control information indicating whether to allow an input/output operation of a memory when the debugging operation is performed.

The method may further detecting whether the request to initiate authentication of the user is changed or whether a challenge or a response used in the challenge-response authentication operation is changed.

The method may further include terminating the debugging operation when a change is detected in the request to initiate authentication, the challenge or the response.

According to an aspect of another exemplary embodiment, there is provided a device including a plurality of processors; and a secure debugging circuit configured to perform a debugging operation on the plurality of processors using a challenge-response authentication operation, wherein the secure debugging circuit comprises a debugging circuit configured to debug the plurality of processors according to a request of a user; an authentication protocol controller configured to perform the challenge-response authentication operation with the user; a memory device configured to store intermediate values generated during the challenge-response authentication operation; and an access controller configured to generate access control signals for the plurality of processors based on access control information received from the user, wherein an access to the debugging circuit of each of the plurality of processors is activated or deactivated in response to the access control signals.

The memory device may store a device identifier (ID) corresponding to the device.

The memory device may store a request to initiate authentication from the user for initiating the challenge-response authentication operation.

The device may further include a cryptographic device configured to verify the request to initiate authentication of the user.

The device may further include a random number generator configured to generate a random number; and the cryptographic device generates a challenge to be used in the challenge-response authentication operation using the generated random number.

The memory device may store the access control information received from the user.

A response to the challenge that is received from the user during the challenge-response authentication operation may be stored in the memory, and validity of the stored response may be verified by a cryptographic device.

The device may further include an attack detection circuit configured to detect whether a request to initiate authentication from the user is changed during the challenge-response authentication operation or whether a challenge or a response used in the challenge-response authentication operation is changed, and wherein the attack detection circuit terminates the debugging operation when the attack detection circuit detects that the request to initiate authentication is changed, or that the challenge or the response is changed.

The access controller may generate the access control signals by decoding the access control information from the user.

The access control information may include processor access control information, bus access control information, memory access control information, or control information for activating/inactivating at least one function in a debugging environment.

According to an aspect of another exemplary embodiment, there is provided an integrated circuit including a plurality of processors; and a secure debugging circuit that is configured to perform a debugging operation by activating or deactivating an access to a Joint Test Action Group (JTAG) port of each of the processors based on access control information received from a user after a challenge-response authentication operation.

The secure debugging circuit may include an attack detection circuit configured to detect whether a request to initiate authentication from the user for initiating the challenge-response authentication operation is changed, or whether a challenge or a response used in the challenge-response authentication operation is changed, and wherein the attack detection circuit terminates the debugging operation according to a result of the detection by the attack detection circuit.

The integrated circuit may be an application processor.

According to another aspect of an exemplary embodiment, there is provided a debugging system including a first device which performs a challenge-response authentication operation using a public key system, and performs a debugging operation via an access port that is activated according to access control information; a second device which generates the access control information and controls the debugging operation; and a response server which has a public key and a personal key for providing the public key system, and authenticates the first device and the second device.

The response server may be included in the second device.

According to an aspect of another exemplary embodiment, there is provided a method of authenticating debugging for a device which includes a plurality of processors, the method including receiving a request to initiate authentication and request information from a user, the request information indicating the user has completed an authentication procedure with a response server; generating a challenge based on the received request information, the challenge being used in a challenge-response authentication with the response server; receiving a response to the challenge that is generated by the response server and access control information, from a user; and after verifying the received response to the challenge, generating at least one access control signal to permit debugging access to a device to be debugged using the received the access control information.

The access control signal permits debugging access to a processor, a bus, or a memory of the device to be debugged.

The access control information may include processor access control information, bus access control information, memory access control information, or control information for activating/inactivating at least one function in a debugging environment.

The generating the challenge may include generating a random number, and generating the challenge using the generated random number.

The method may further include detecting whether the request to initiate authentication is changed during the challenge-response authentication, or whether the challenge or the response to the challenge in the challenge-response authentication is changed, and preventing the debugging access when a change is detected.

BRIEF DESCRIPTION OF THE FIGURES

The above and other aspects will become apparent from the following description of exemplary embodiments with reference to the following figures, wherein like reference numerals refer to like parts throughout the various figures unless otherwise specified, and wherein.

DETAILED DESCRIPTION

Figure 1:
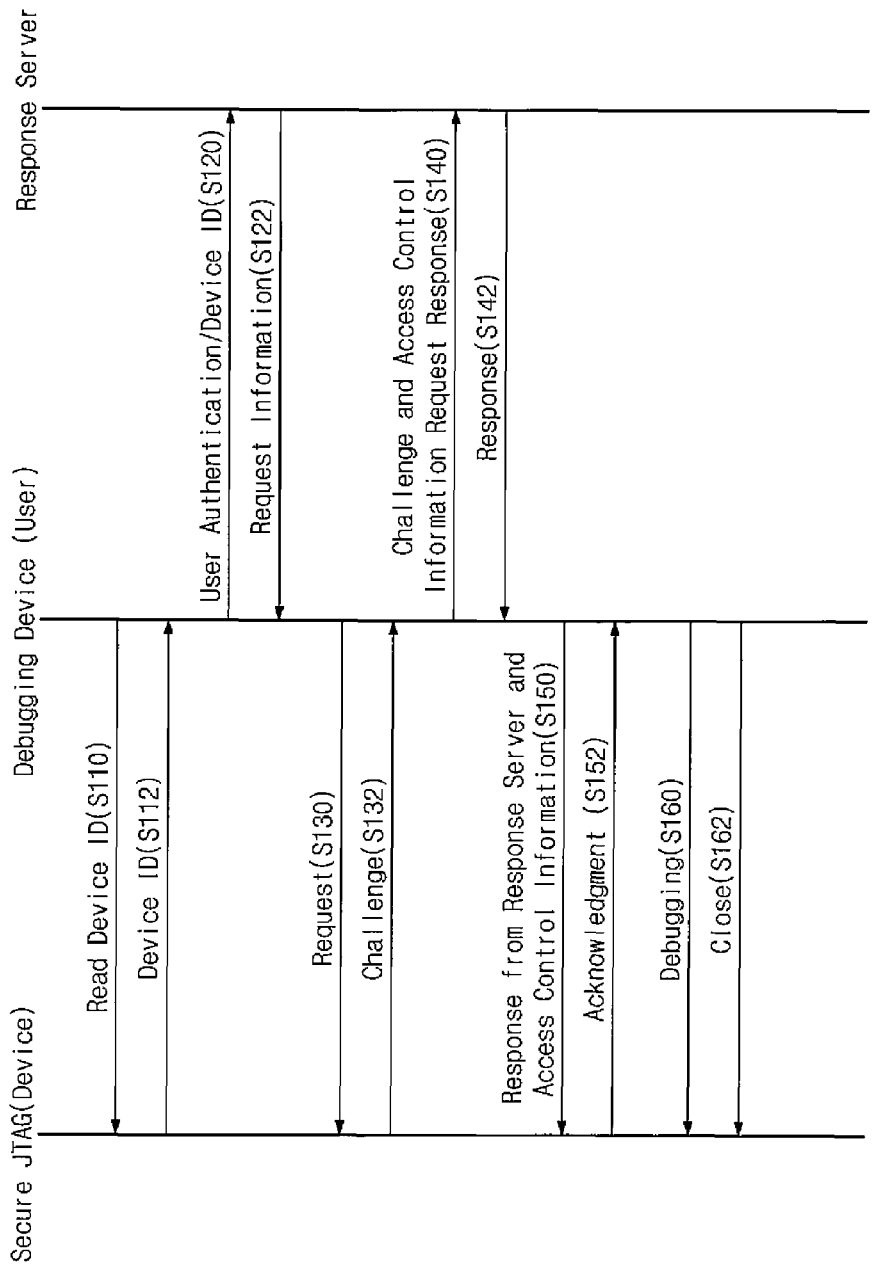
FIG. 1 is a diagram schematically illustrating a debugging authentication protocol according to an exemplary embodiment.

Exemplary embodiments will be described in detail with reference to the accompanying drawings. The inventive concept, however, may be embodied in various different forms, and should not be construed as being limited only to the illustrated exemplary embodiments. Rather, these exemplary embodiments are provided as examples so that this disclosure will be thorough and complete, and will fully convey the inventive concept to those skilled in the art. Accordingly, known processes, elements, and techniques are not described with respect to some of the exemplary embodiments. Unless otherwise noted, like reference numerals denote like elements throughout the attached drawings and written description, and thus descriptions will not be repeated. In the drawings, the sizes and relative sizes of layers and regions may be exaggerated for clarity.

A secure JTAG (or, a secure debugging circuit) according to an exemplary embodiment may use challenge-response authentication using a public key cryptosystem. A user authentication protocol may restrict an access of an aggressor maximally. The secure JTAG may incorporate one or more attack countermeasures to prevent an attack of an aggressor that can occur while a user is certified. Also, the secure JTAG may provide a more secure/restrictive debugging environment through individual/independent access control for a plurality of processors in a device. Further, the secure JTAG may grant specific functionality to the access control for a more a secure debugging environment.

An authentication algorithm (hereinafter, referred to as a debugging authentication algorithm) for starting debugging according to an exemplary embodiment is configured as follows. First, a debugging system includes a secure JTAG, a debugging tool operated by a user, and a response server to execute an authentication protocol. Here, the response server is configured to certify the user. The authentication by the response server may be made according to various methods. Also, the response server stores information on an access control authority of various users. The debugging authentication algorithm may be accomplished through individual operations of the secure JTAG, the debugging tool operated by the user, and the response server and intercommunication thereof. Individual components may perform corresponding operations and communication. The debugging authentication algorithm may use challenge-response authentication.

The secure JTAG according to an exemplary embodiment may obtain the following effects. First, the response server only provides a certified user with a request value for execution of an authentication protocol and the secure JTAG verifies the request value as a used value during a subsequent request to initiate the authentication protocol. An aggressor that is not certified by the response server does not initiate the authentication protocol. Second, the challenge-response manner is safe from replay and dictionary attacks that are applied to a related art password operation. Third, a user's access is restricted according to the use by access control with respect to an individual processor even in a multi-processor environment, thereby providing a more stable debugging environment. Fourth, the access control is applicable to components (e.g., a bus or a memory) as well as an individual processor, so the access control is used to activate or inactivate a specific function. Fifth, the secure JTAG detects an attack of an aggressor that occurs during authentication.

As described above, the secure JTAG according to an exemplary embodiment may provide a more stable debugging environment.

FIG. 1 is a diagram schematically illustrating a debugging authentication protocol according to an exemplary embodiment. Now will be described a debugging process with reference to FIG. 1.

In operation S110, a debugging device, which is operated by a user, requests a device ID of a device to be debugged from a secure JTAG (or, a device). In operation S112, the secure JTAG provides the device ID to the debugging device in response to the request. In operation S120, the debugging device connects with a response server using a secure authentication method to authenticate the user of the debugging device, and transmits the device ID of the device to be debugged that is received from the secure JTAG to the response server. In operation S122, the response server provides the debugging device with request information for a request to a device corresponding to the device ID.

In operation S130, the debugging device transmits a request for initiating authentication to the secure JTAG using the request information from the response server. In some exemplary embodiments, the request information may be a specific value that the secure JTAG and the response server share. For example, the request information may be a public key of the response server or a domain parameter of an algorithm for response verification. When the secure JTAG receives the request for initiating authentication from the debugging device, the secure JTAG generates a challenge based on the request information. In operation S132, the secure JTAG transmits the challenge to the debugging device. The challenge is used to verify whether the request for initiating authentication was provided from the debugging device by a legal user (e.g., a user who is not a malicious user) of the debugging device. In some exemplary embodiments, the challenge may be a random value.

The secure JTAG may verify the request information. That is, the secure JTAG may include a verification circuit that is formed of hardware or firmware, or the secure JTAG may include a verification module that is formed of software. The verification circuit or the verification module may verify the request information. For example, if the request information is a user key that is a public key, the secure JTAG may have a certificate on the public key that is already stored at the secure JTAG, and may verify the public key with the certificate on file. If the request information is the domain parameter, the secure JTAG may have a hash code of file that is capable of checking the integrity of the domain parameter.

Upon receiving the challenge from the secure JTAG, the debugging device generates access control information for accessing the device. That is, the access control information indicates which component(s) the debugging device would like access control over. In operation S140, the debugging device transmits the challenge and the access control information to the response server, and requests a response. The response server verifies whether the challenge and access control information is valid or not. When the challenge and access control information is not valid such as in the case in which the debugging device operated by the user requests access control that is over the authority of the user, the response server does not generate a response. On the other hand, when the challenge and access control information is valid, the response server transmits a response to the debugging device in operation S142.

In operation S150, the debugging device transfers the response that is received from the response server and the access control information to the secure JTAG. The secure JTAG determines whether the response is issued from the response server. As a consequence of determining that the response is issued from the response server, the secure JTAG assigns authority based on the access control information and, in operation S152, the secure JTAG transmits an acknowledgement to the debugging device. The acknowledgement may be in the form of an acknowledgement signal. As a consequence of determining that the response is not issued from the response server (e.g., where a malicious user has transmitted a false response that was generated by the malicious user), the debugging authentication protocol ends.

In operation S160, the debugging device that receives the acknowledgement from the secure JTAG accesses a device via the secure JTAG to begin debugging. In operation S162, the debugging device provides the device with a close signal, indicating that an access is terminated, after the debugging is ended.

The debugging authentication protocol according to an exemplary embodiment may implement the challenge-response protocol after user authentication/request verification. Also, it is possible to provide a more stable debugging environment by controlling an access to a secure JTAG of an internal configuration of a device according to access control information.

Figure 2:
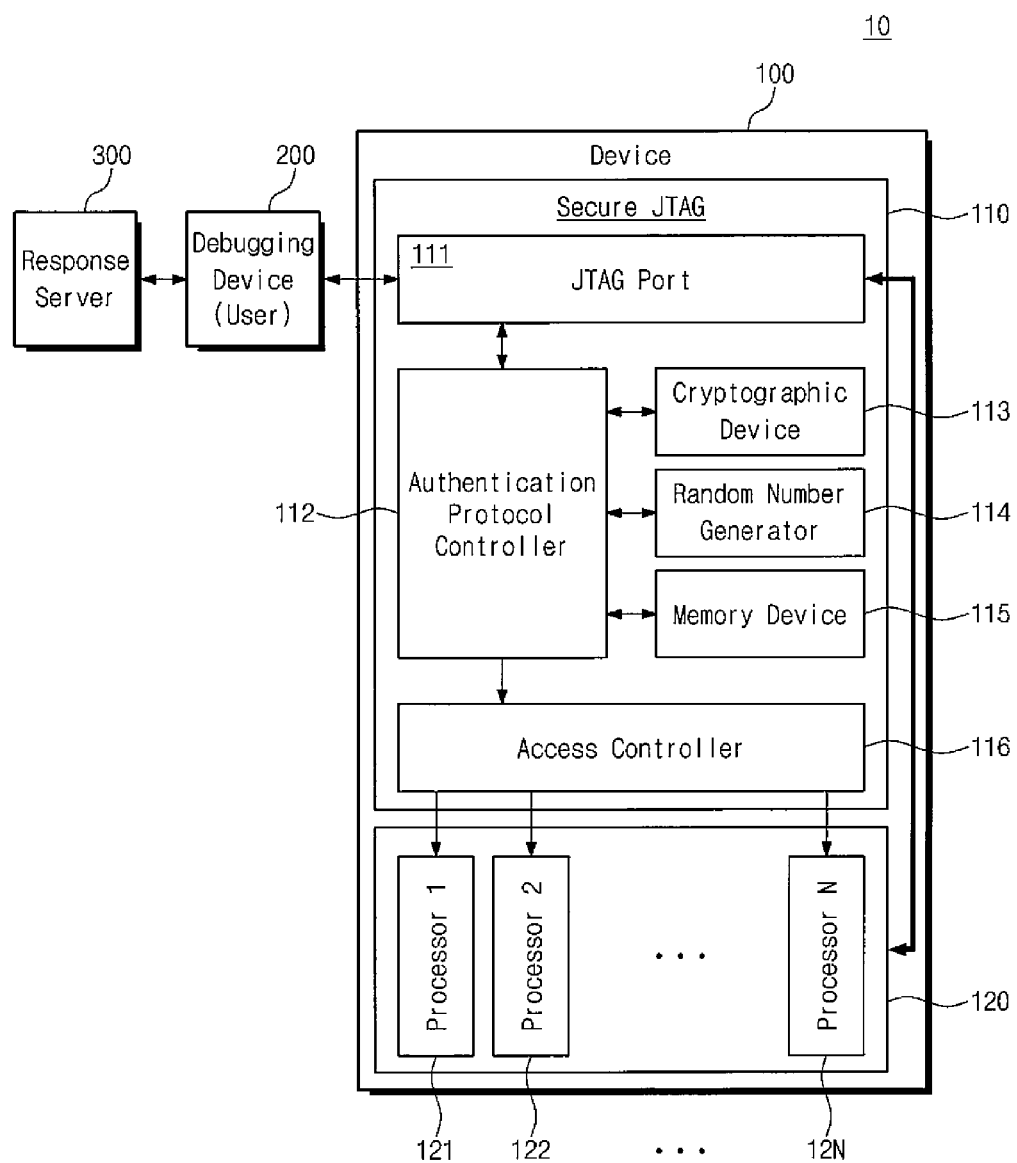
FIG. 2 is a block diagram schematically illustrating a debugging system according to an exemplary embodiment.

FIG. 2 is a block diagram schematically illustrating a debugging system according to an exemplary embodiment. Referring to FIG. 2, a debugging system 10 includes a device 100, a debugging device 200 operated by a user, and a response server 300.

The device 100 incorporates a secure JTAG 110 (or, referred to as secure debugging circuit) and a central processing unit 120. The secure JTAG 110 includes JTAG port 111 (or, referred to as a debugging circuit), an authentication protocol controller 112, a cryptographic device 113, a random number generator 114, a memory device 115, and an access controller 116.

The central processing unit 120 includes a plurality of processors 121 to 12N. In some exemplary embodiments, the central processing unit 120 may be an application processor.

The JTAG PORT 111 is configured to drive all external pins of the processors 121 to 12N of the device 100, and to read values therefrom or write values thereto. The JTAG 110 may provide an interface for executing debugging on the processors 121 to 12N by the debugging device 200 that is operated by a user after debugging authentication is ended. The JTAG PORT 111 may be configured to drive all external pins of at least one intellectual property (IP) included in the device 100, and to read values therefrom or write values thereto. In general, the JTAG port 111 may have ports such as data input (TDI), data output (TDO), clock (TCK), mode (TMS), reset (TRST), and so on.

The authentication protocol controller 112 may implement a debugging authentication protocol. Here, the debugging authentication protocol may be the challenge-response authentication protocol shown in FIG. 1. The cryptographic device 113 may be configured to execute a hash or public cryptosystem. The cryptographic device 113 may generate a challenge using a random number as a seed value. The random number generator 114 generates the random number as the seed value for generating the challenge. Here, the random number may be a true random number or a pseudo random number. The memory device 115 stores at least one device ID and associated with each device ID, intermediate values produced during the progress of the authentication protocol.

The access controller 116 generates access control signals for controlling an access to the JTAG port 111 of the processors 121 to 12N based on access control information from the user. In some exemplary embodiments, the access controller 116 decodes the access control information to generate the access control signals. Based on the access control signals, an access to the JTAG port 111 of each of the processors 121 to 12N may be activated or deactivated.

The debugging device 200 that is operated by the user may be formed of hardware or firmware that debugs internal components (e.g., processors) of the device 100. Alternatively, the debugging device 200 may be formed of software that provides a tool for debugging the internal components of the device 100. The response server 300 may perform device authentication and user authentication. The response server 300 helps to execute challenge-response authentication between the debugging device 200 and the secure JTAG 110. The response server 300 may issue a user's request and a user's response.

The debugging system 10 according to an exemplary embodiment may perform debugging or testing by activating, based on access control information, an access to the JTAG port 111 after both the authentication of the user and the challenge-response authentication are successfully performed.

Now will be described a method of a debugging authentication protocol using a debugging system shown in FIG. 2 with reference to FIGS. 3 to 9.

Figure 3:
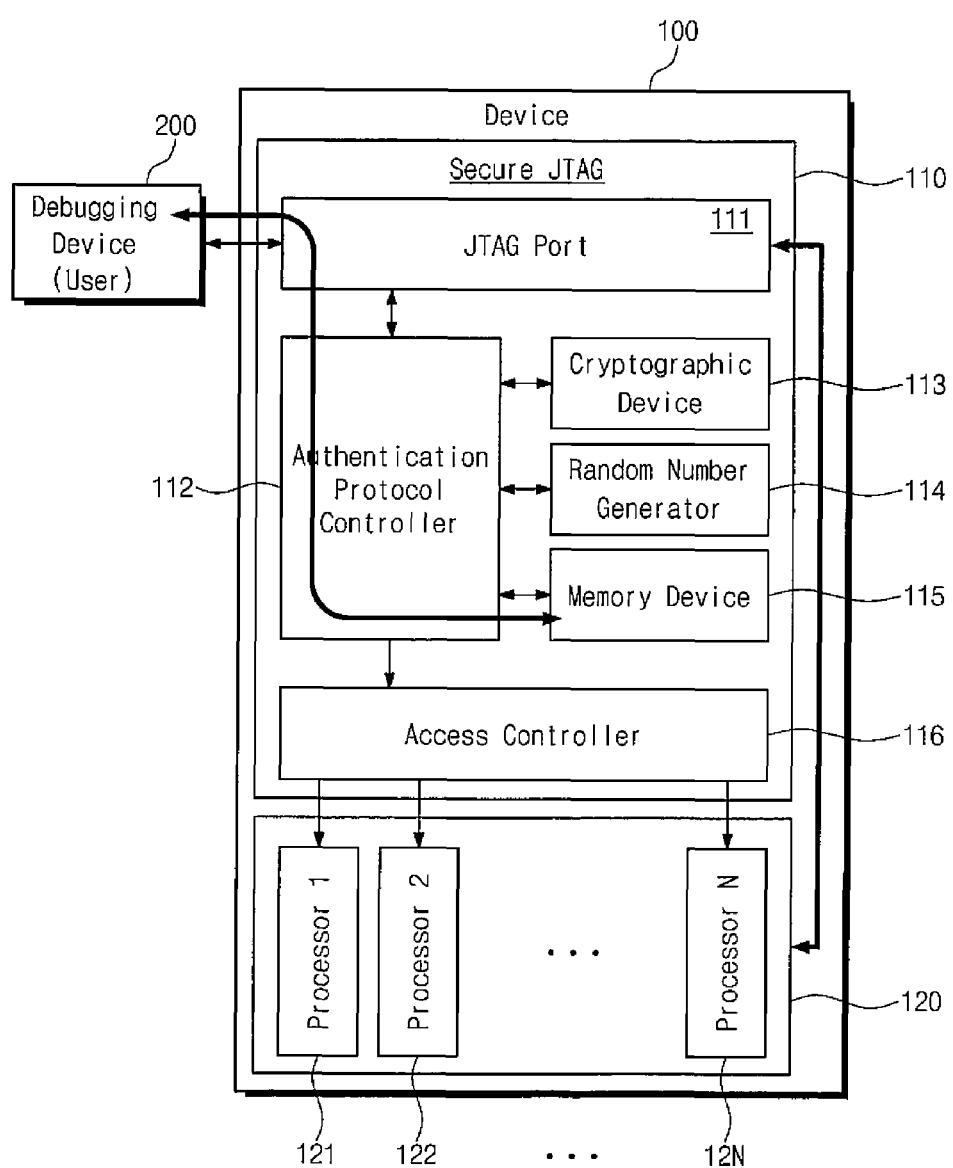
FIG. 3 is a diagram schematically illustrating operations of requesting and transferring a device ID in the debugging protocol of FIG. 1.

FIG. 3 is a diagram schematically illustrating operations of requesting and transferring a device ID in the debugging protocol of FIG. 1. In FIG. 3 the operations S110 and S112 of requesting a device ID (S110) and transferring the device ID (S112) are shown in relation to the debugging system of FIG. 2. Referring to FIG. 3, a debugging device 200 that is operated by a user requests a device ID to a device 100. An authentication protocol controller 112 reads a device ID from a memory device 115 in response to the request received via JTAG port 111 and transmits the device ID thus read to the debugging device 200 that is operated by the user.

Figure 4:
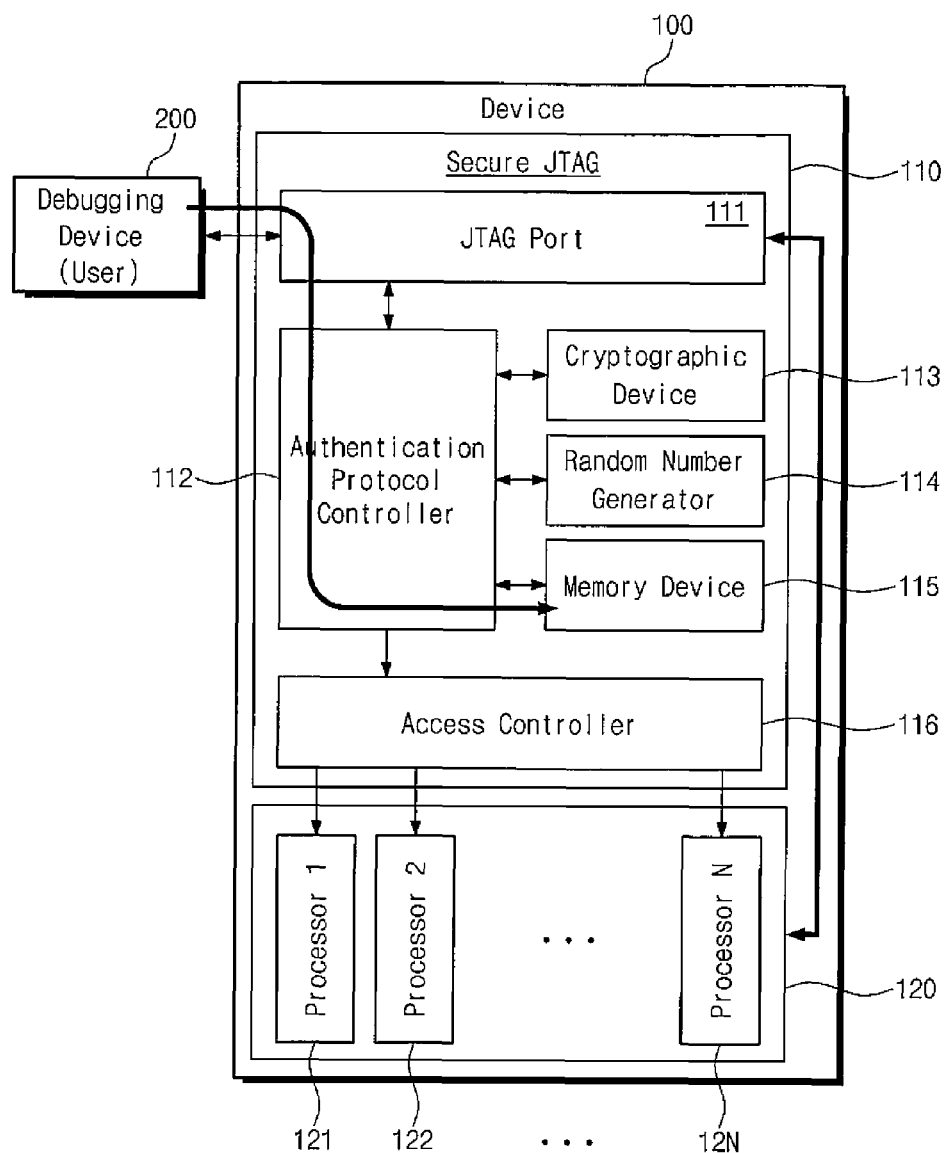
FIG. 4 is a diagram schematically illustrating an operation of writing a request in the debugging protocol of FIG. 1.

FIG. 4 is a diagram schematically illustrating an operation of writing request information in the debugging protocol of FIG. 1. In FIG. 4, the operation of writing the request information transmitted by the debugging device in operation S130 is shown in relation to the debugging system of FIG. 2. Referring to FIGS. 1 and 4, if a response server 300 completes authentication on a user of the debugging device 200 for a device 100, the response server transmits request information to the debugging device 200 (S122). The request information may include a public key or a domain parameter as discussed above. The debugging device 200 then transmits the request information, e.g., the public key or domain parameter, of the response server 300 to the device 100 (S130). The authentication protocol controller 112 stores the request information in the memory device 115.

Figure 5:
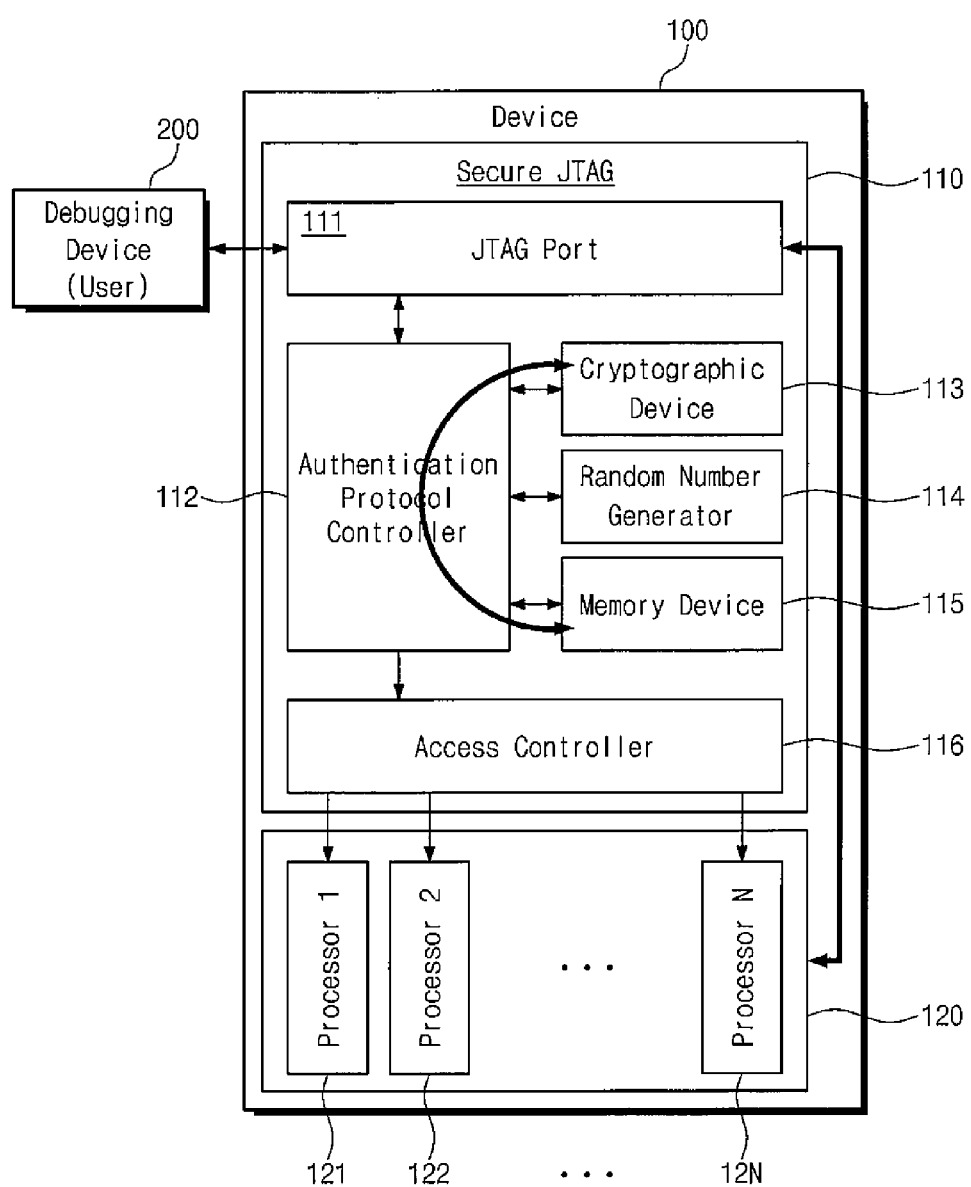
FIG. 5 is a diagram schematically illustrating an operation of verifying validity of a request of a user in the debugging protocol of FIG. 1.

FIG. 5 is a diagram schematically illustrating an operation of verifying validity of request information in the debugging protocol of FIG. 1. In FIG. 5, the operation of verifying the validity of the request information is shown in relation to the debugging system of FIG. 2. Referring to FIGS. 1 and 5, whether the request information provided by the debugging device 200 (S130) is equal to a stored value (e.g., a hash code) is determined using cryptographic device 113. When the request is a public key of a response server 300, validity of the request is verified using a certificate of the public key.

Figure 6:
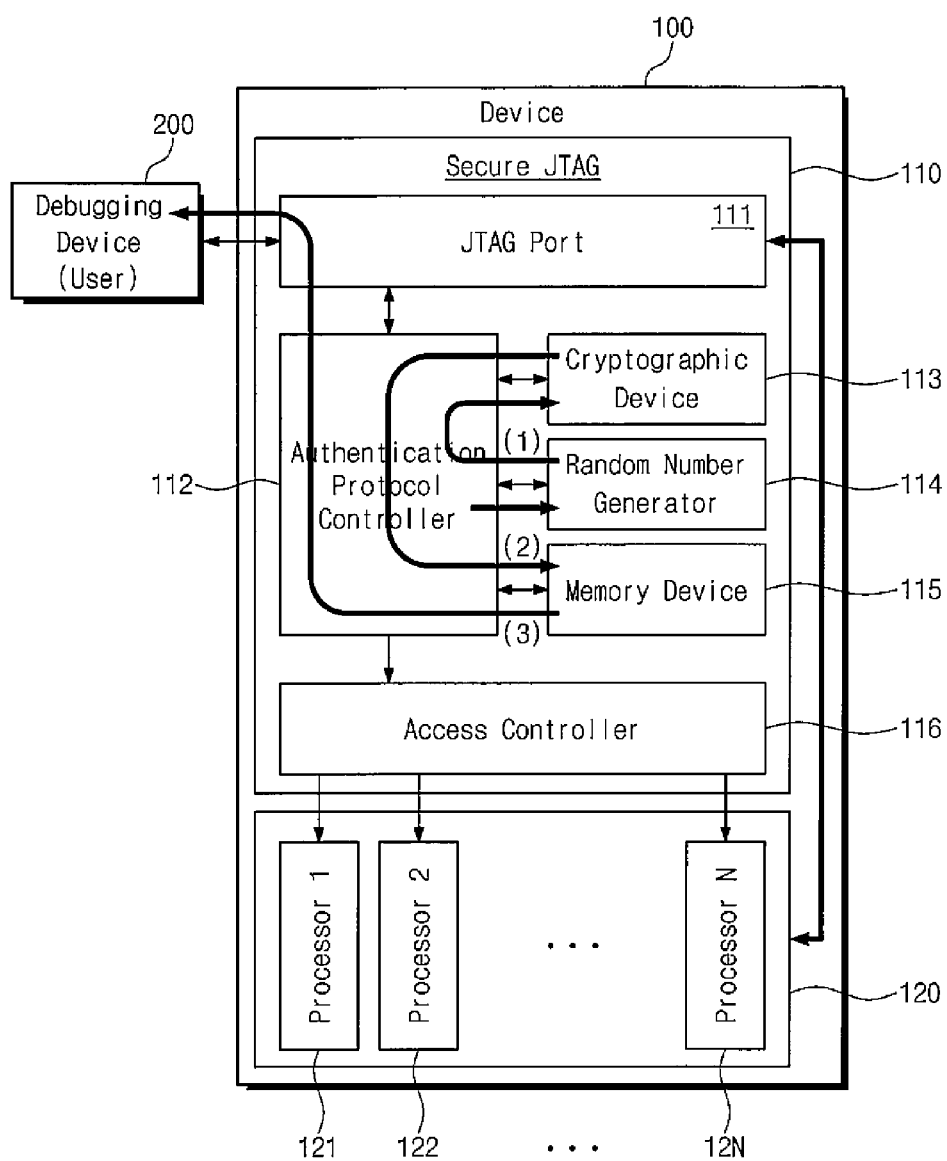
FIG. 6 is a diagram schematically illustrating an operation of issuing a challenge and transferring the challenge to a user in the debugging protocol of FIG. 1.

FIG. 6 is a diagram schematically illustrating an operation of generating a challenge and transmitting the challenge in the debugging protocol of FIG. 1. In FIG. 6, the operation of generating the challenge and transmitting the challenge to the debugging device is shown in relation to the debugging system of FIG. 2. Referring to FIGS. 1 and 6, if the request to initiate authentication that includes the request information from the debugging device 200 (S130) is determined to be valid, the device 100 generates a challenge for initiating a challenge-response protocol. A random number generator 114 determines the validity of the user's request, and then, the random number generator 114 generates a random number. Here, the random number may be a seed value for challenge generation. Cryptographic device 113 may receive the seed value to issue a random challenge by a cipher function (or, a hash function) (1). The challenge is stored in the memory device 115 (2). Afterwards, the challenge stored in the memory device 115 is transmitted to the debugging device 200 (3) (S132).

Figure 7:
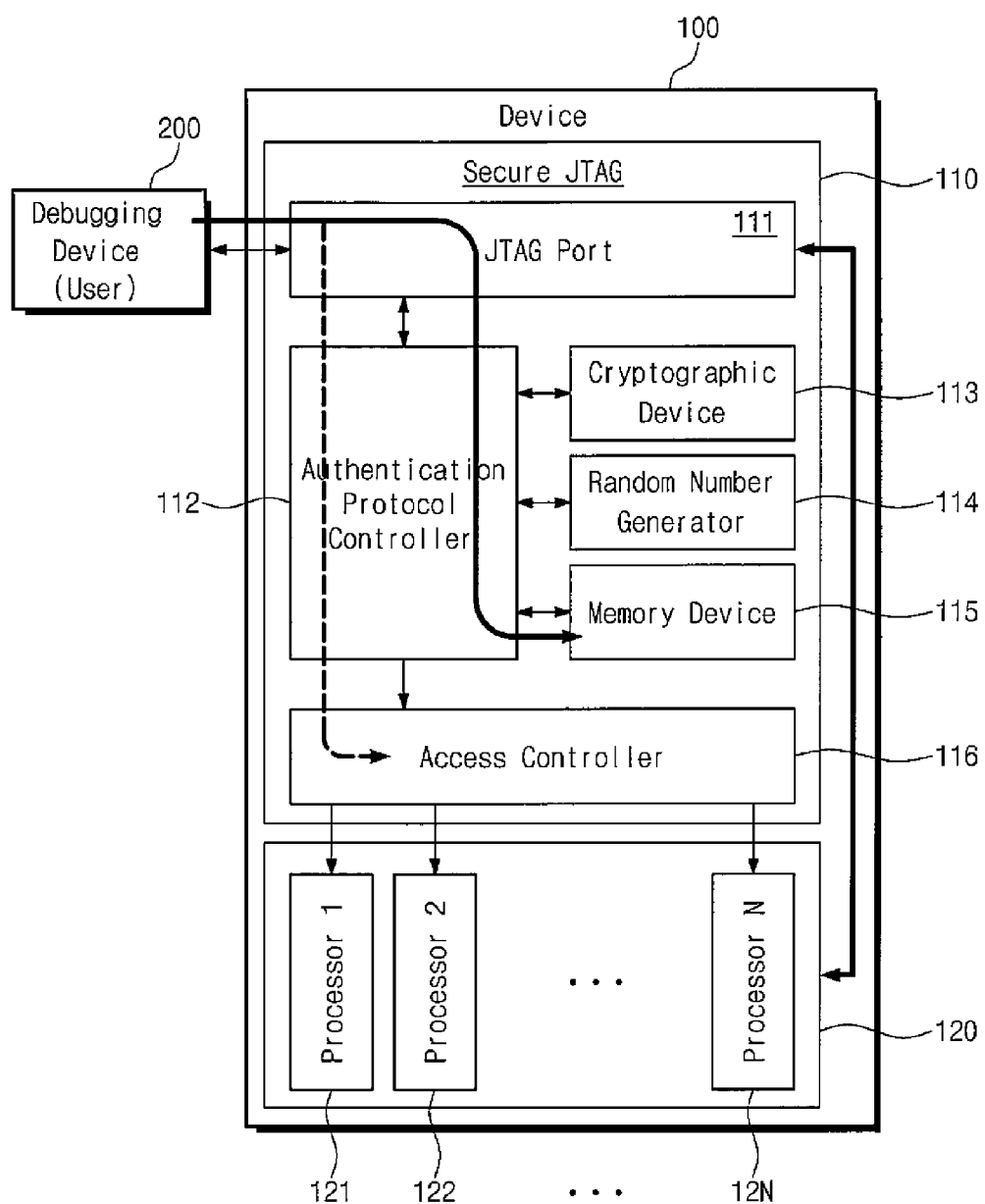
FIG. 7 is a diagram schematically illustrating an operation of writing response/access control information in the debugging protocol of FIG. 1.

FIG. 7 is a diagram schematically illustrating an operation of writing response and access control information in the debugging protocol of FIG. 1. In FIG. 7, the operation of writing the response and access control information is shown in relation to the debugging system of FIG. 2. Referring to FIG. 7, after the debugging device 200 receives the challenge (S132), the debugging device 200 transmits the challenge and access control information to the response server, and requests a response (S140). If the access control information is determined to be a valid access, the response server 300 issues the response (S142). The debugging device 200 then transmits the response from the response server and the access control information to the secure JTAG 110. Here, the response from the response server may be a value that is generated by the response server 300 and issued according to the challenge, the device ID, the access control information, and the public key of the response server 300. For example, the response may be a digital signature. In some exemplary embodiments, the response from the response server and the access control information that the secure JTAG 110 receives from the debugging device 200 (S150) may be stored in the memory device 115. In other exemplary embodiments, the access control information may be stored in the access controller 116.

Figure 8:
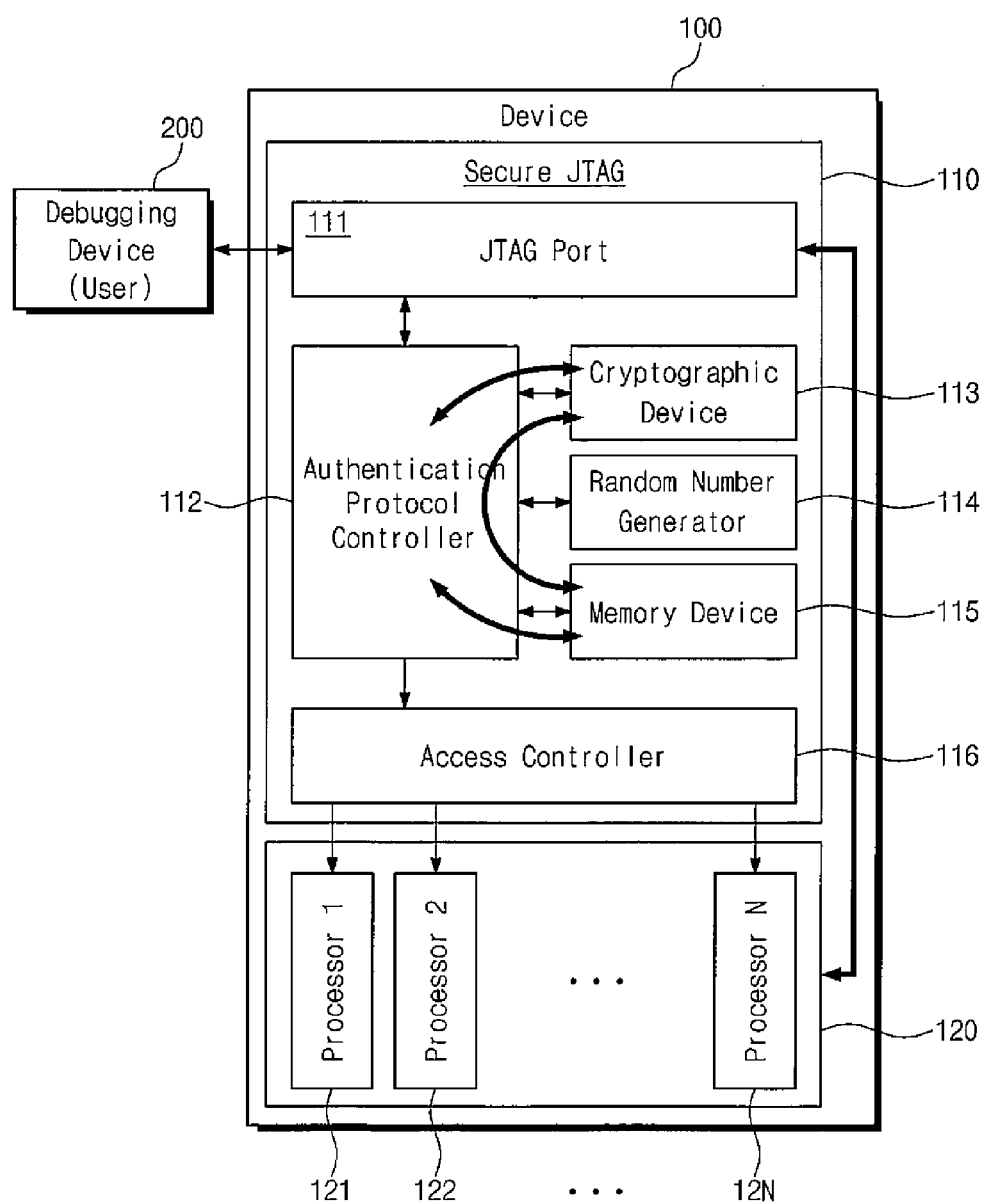
FIG. 8 is a diagram schematically illustrating an operation of verifying validity of a response of a user in the debugging protocol of FIG. 1.

FIG. 8 is a diagram schematically illustrating an operation of verifying validity of a response and access control information in the debugging protocol of FIG. 1. In FIG. 8, the operation of verifying validity of the response and the access control information received from the debugging device is shown in relation to the debugging system of FIG. 2. Referring to FIGS. 1 and 8, the device 100 receives the response from the response server and the access control information from the debugging device 200 (S150). The authentication protocol controller 112 verifies whether the response received from a debugging device 200 is valid using cryptographic device 113. That is, there may be determined whether the response that is transmitted by the debugging device 200 (S150) is issued from the response server 300.

Figure 9:
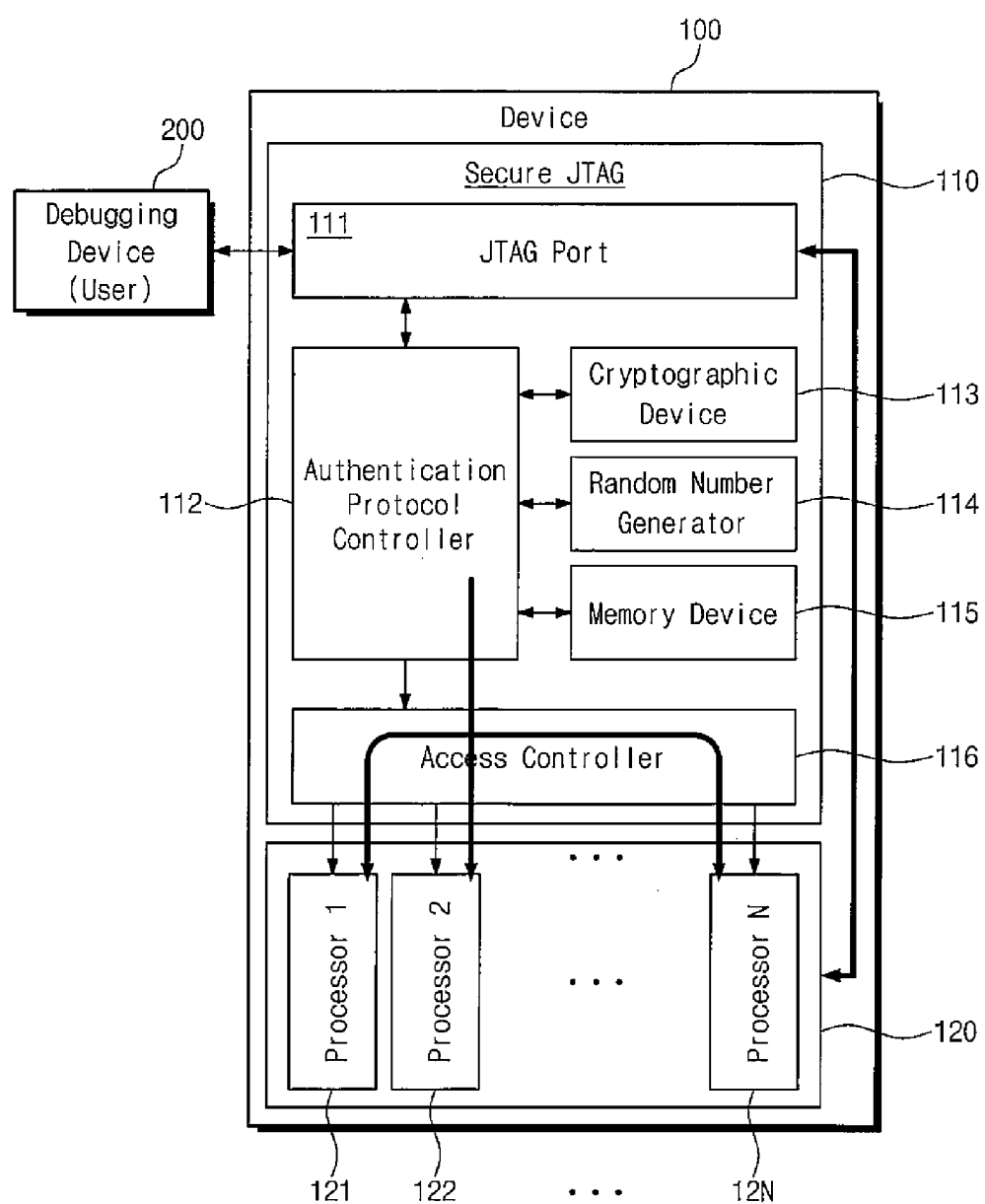
FIG. 9 is a diagram schematically illustrating an operation of activating debugging in the debugging protocol of FIG. 1.

FIG. 9 is a diagram schematically illustrating an operation of activating debugging in the debugging protocol of FIG. 1. In FIG. 9, the operation of activating debugging is shown in relation to the debugging system of FIG. 2. Referring to FIG. 9, after verifying the response from the response server is valid, the access controller 116 generates access control signals based on the access control information received from the debugging device 200. Whether to activate debugging of each of processors 121 to 12N may be determined based on the access control signals. That is, the access controller 116 may assign an access right to JTAG port 111 to the processors 121 to 12N using the access control signals.

Figure 10:
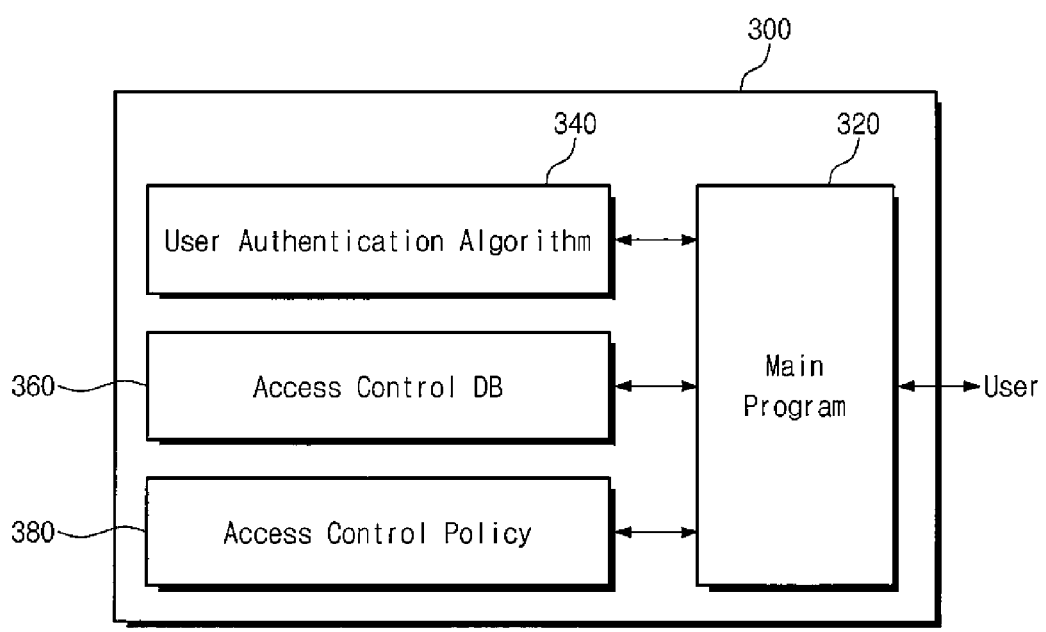
FIG. 10 is a diagram schematically illustrating a response server according to an exemplary embodiment.

FIG. 10 is a diagram schematically illustrating a configuration of a response server according to an exemplary embodiment. Referring to FIG. 10, a response server 300 includes a main program 320, a user authentication algorithm 340, access control database ((DB) 360, and an access control policy 380.

The main program 320 may generate a response to be used in a challenge-response authentication operation. The user authentication algorithm 340 may include a user's ID corresponding to a user who is operating the debugging device 200. The access control database 360 may include a database in which separate access rights for various processors of a multi-processor are indicated and stored for various users. The access control policy 380 may have policy for determining access authentication assignment suitable for a user of the debugging device 200 in conjunction with the access control database 360.

In exemplary embodiments, the response server 300 is managed by a manufacturer of a device 100, by a user of the debugging device 200, or by a third party (e.g., an authentication institution).

The response server 300 according to an exemplary embodiment may grant individual/independent access rights to a user of the debugging device 200 to internal components of the device 100 using the access control database 360 and the access control policy 380.

Figure 11:
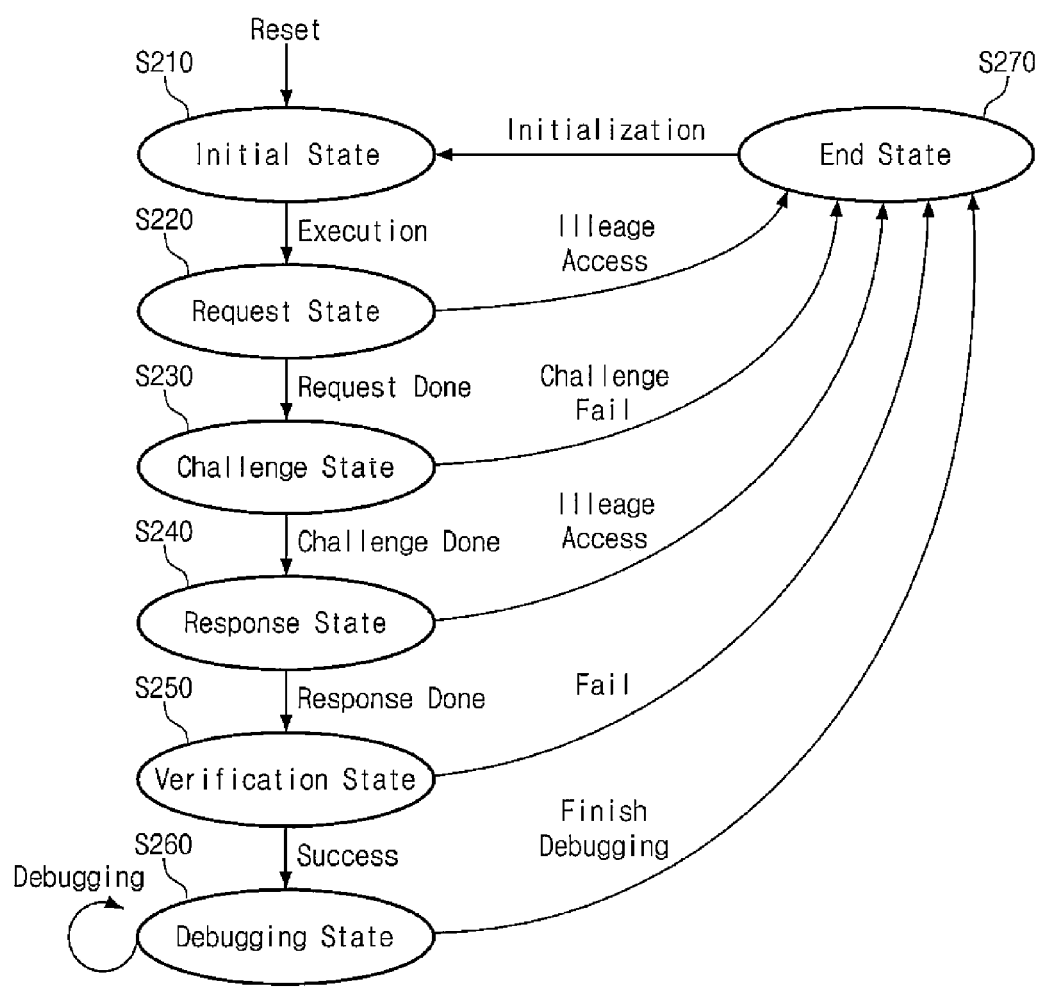
FIG. 11 is a state transition diagram schematically illustrating an operation of a secure JTAG according to an exemplary embodiment.

FIG. 11 is a state transition diagram schematically illustrating an operation of a secure JTAG according to an exemplary embodiment. Now will be described an operation of the secure JTAG 110 with reference to FIGS. 1 to 11.

A device 100 is at an initial state S210 when reset. The device 100 transitions to a request state S220 if a secure JTAG 110 is executed by a user of the debugging device 200 or by an internal signal. At the request state S220, the secure JTAG 110 waits for a request from the debugging device 200. The secure JTAG 110 verifies whether a request received from the user of the debugging device 200 is a legal request. If the request is valid, the device 100 transitions to a challenge state S230. At the challenge state S230, the secure JTAG 110 generates challenge. At this time, the device 100 transitions to a response state S240. At the response state S240, the secure JTAG 110 waits for a response from the user of the debugging device 200.

If receiving a response and access control information from the user 200, the device 100 transitions to a verification state S250. At the verification state S250, the secure JTAG 110 verifies the response. If the verification succeeds, that is, if it is determined as being a valid response, the device 100 transitions to a debugging state S260. At the debugging state S260, debugging may be performed based on access control information that the user of the debugging device 200 inputs. After the debugging is ended, the device 100 transitions to an end state S270 if the user 200 transmits a finish signal "Finish Debugging" to the secure JTAG 110. The device 100 transitions to the end state S270 when an illegal operation/access or an attack is detected at each of the states S210 to S250. Afterwards, the debugging protocol is ended.

Figure 12:
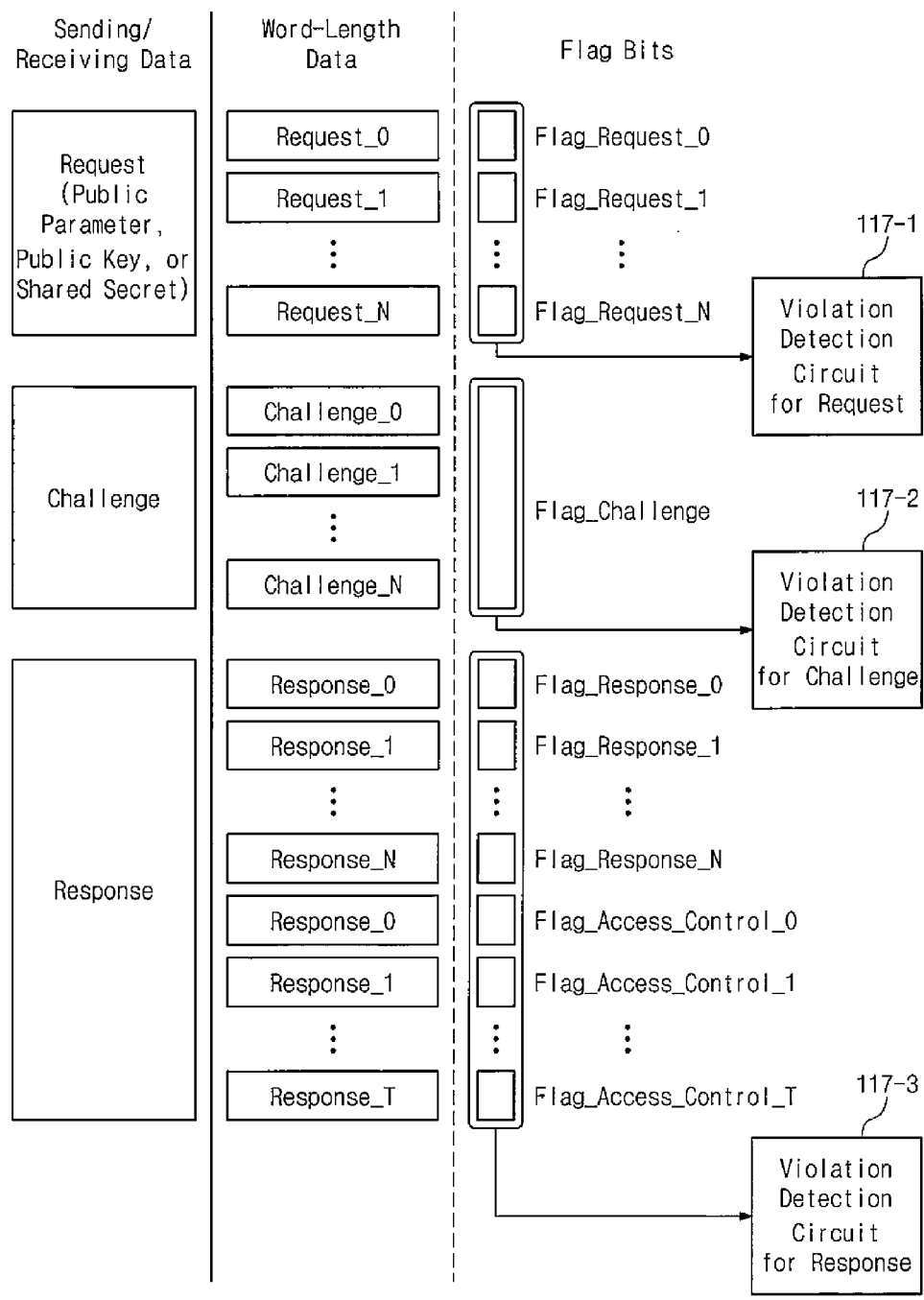
FIG. 12 is a diagram schematically illustrating an attach policy according to an exemplary embodiment.

FIG. 12 is a diagram schematically illustrating an attach policy according to an exemplary embodiment. As shown in FIG. 1, a user of the debugging device 200 transmits a request (S130), receives a challenge (S132), and transmits a response (including access control information) (S150) to the secure JTAG 110. A malicious user of a debugging device 200 or an external aggressor may attempt to get debugging authentication while performing a similar operation.

A possible attach scenario is as follows.

For example, when a secure JTAG 110 operates (in particular, verification on a response is made) under the situation where a request to initiate authentication is determined as being valid, an aggressor may revise a value of the request with a hoped-for value, revise access control information randomly, or revise the challenge with any value. Besides, many attack scenarios may exist. To prevent such attacks, as illustrated in FIG. 12, flag registers are incorporated in the secure JTAG that store a flag bit for a request to initiate authentication value, a challenge value, and a response value. The flag bits are set when the various validity determinations are determined to fail. Whether the request to initiate authentication value, the challenge value, and the response value are attacked may be determined by detecting whether values stored in the flag registers are changed, in real time. The debugging protocol used may be terminated just when an attack is detected.

A secure JTAG 110 according to an exemplary embodiment may further include violation detection circuits (or, countermeasures) 117-1 to 117-3 that detect an illegal operation of a malicious user or an aggressor.

Figure 13:
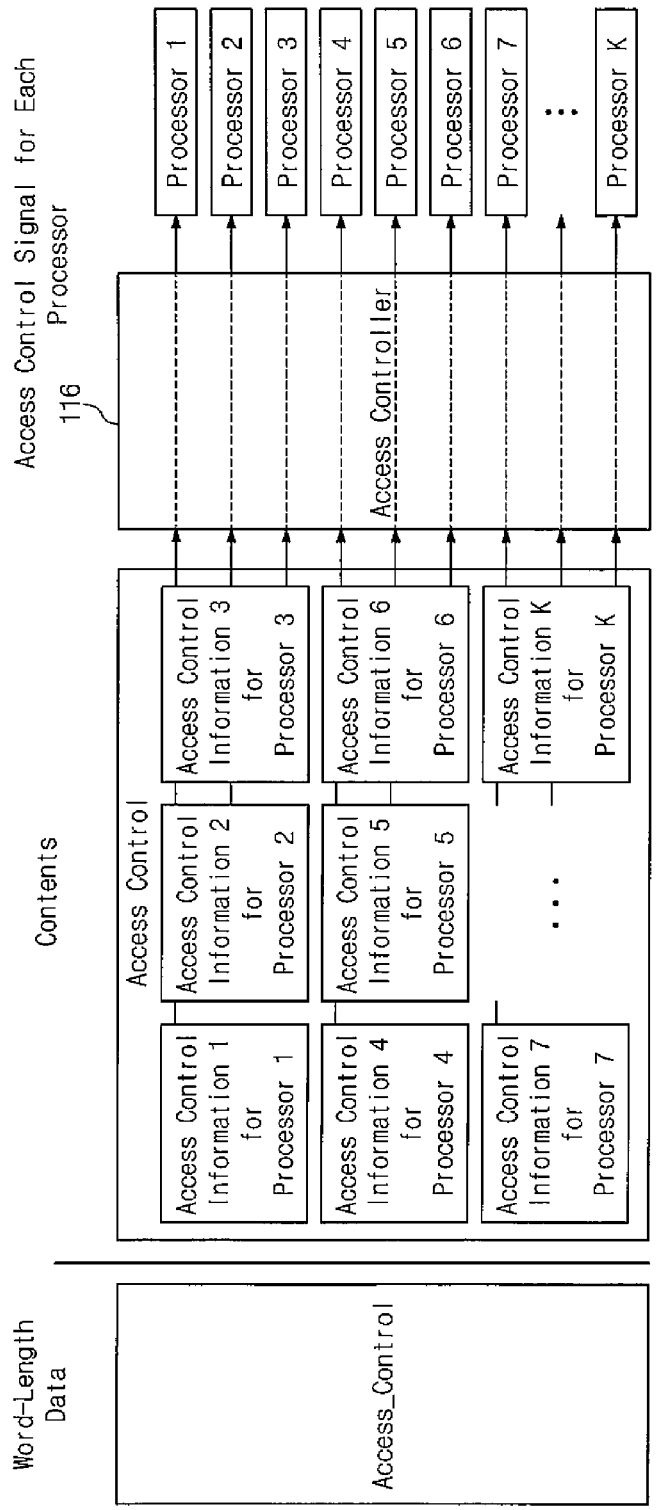
FIG. 13 is a diagram schematically illustrating a method of generating an access control signal, according to an exemplary embodiment.

FIG. 13 is a diagram schematically illustrating a method of generating an access control signal, according to an exemplary embodiment. Referring to FIG. 13, access control information that a user of the debugging device 200 transmits may include information (or, referred to as access control information) associated with an access authority for a device 100.

The access control information may include access control information on each of processors 121 to 12N, that is, Access Control Information 1 for Processor 1, Access Control Information 2 for Processor 2, . . . , Access Control Information K for Processor K. An access controller 116 may generate access control signals on an individual processor based on the access control information. Accesses to a JTAG port 110 of the processors 121 to 12N may be activated or deactivated based on the access control signals thus generated.

A secure JTAG 110 according to an exemplary embodiment may grant a minimum access control right for debugging to the user of the debugging device 200 by generating individual/independent access control signals for the processors 121 to 12N.

Meanwhile, output values (or, access control signals) of an access controller 116 may be used to activate or inactivate processors, respectively. However, the inventive concept is not limited thereto. For example, output values of the access controller 116 may be connected to components (e.g., a memory, a bus, and so on) and used to restrict read/write operations. Also, the output values may be used to activate or inactivate a function of scanning or dumping a value of an internal register. That is, the output values of the access controller 116 may be used as an enable/disable signal for managing a specific function in debugging or operation. Also, the output values of the access controller 116 may be used for an access control on components in a system-on-chip.

Figure 14:
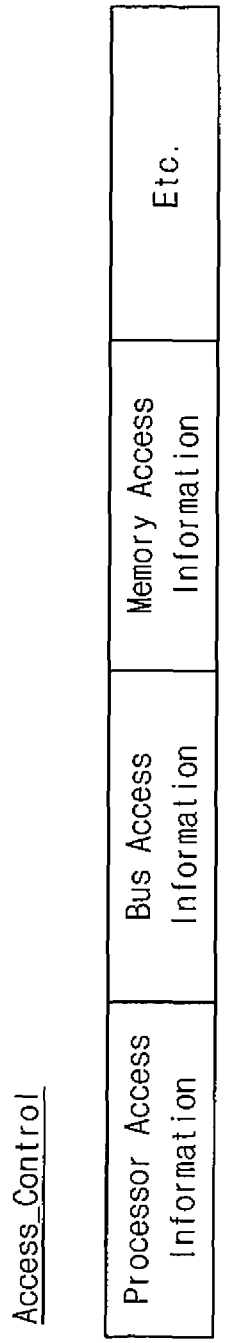
FIG. 14 is a diagram schematically illustrating a configuration of access control information according to an exemplary embodiment.

FIG. 14 is a diagram schematically illustrating a configuration of access control information according to an exemplary embodiment. Referring to FIG. 14, access control information may include, but is not limited to, processor access information, bus access information, and memory access information. A secure JTAG 110, as described above, may have a more stable debugging environment based on the processor access information, bus access information, and memory access information.

Meanwhile, in a debugging system 10 shown in FIG. 2, a response server 300 is illustrated as being separated from a debugging device 200 operated by a user. However, the inventive concept is not limited thereto. The response server 300 may be configured to be included in the debugging device 200.

Figure 15:
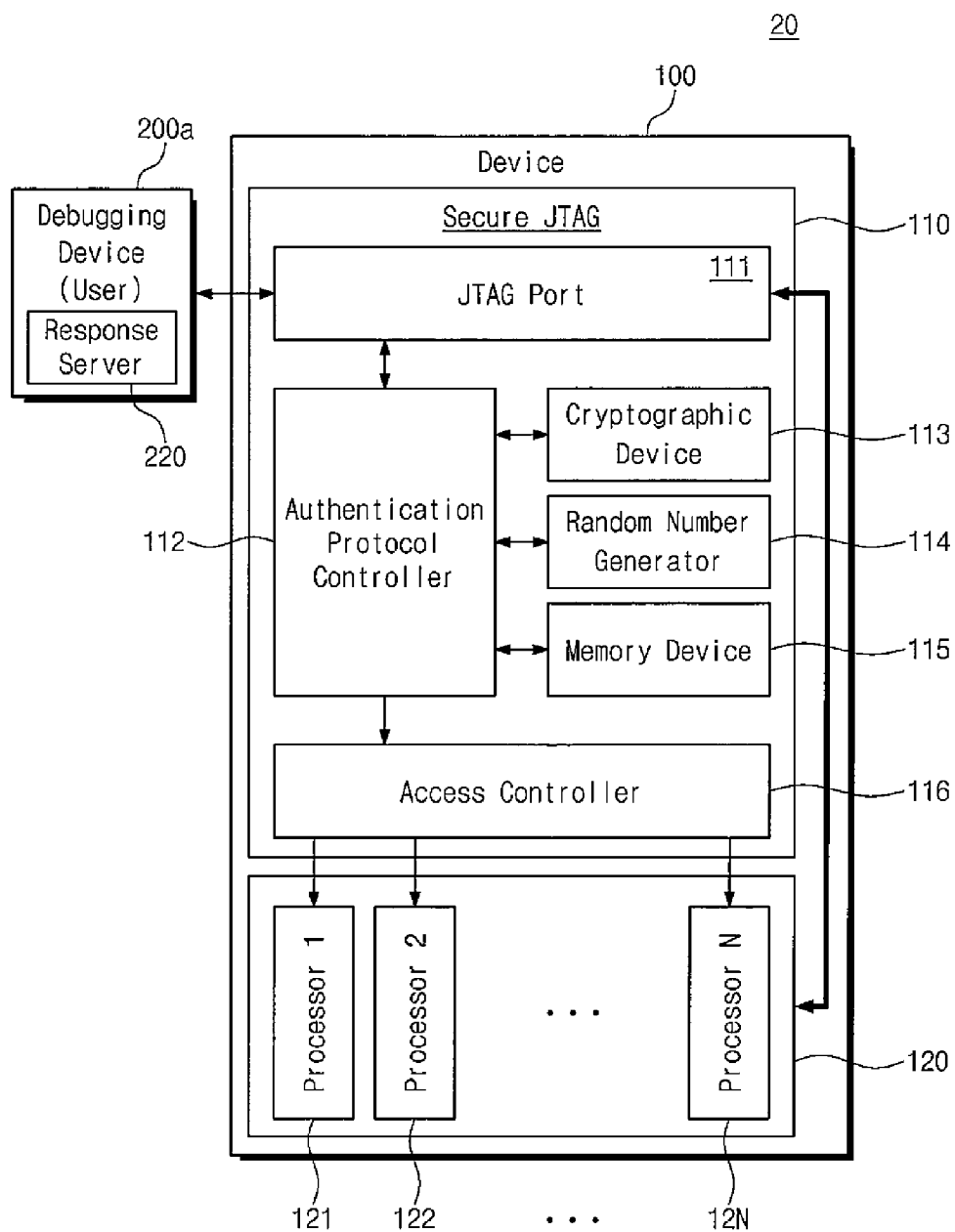
FIG. 15 is a block diagram schematically illustrating a debugging system according to another exemplary embodiment.

FIG. 15 is a block diagram schematically illustrating a debugging system according to another exemplary embodiment. Referring to FIG. 15, a debugging system 20 includes a device 100 and a debugging device 220a that includes a response server 220.

Figure 16:
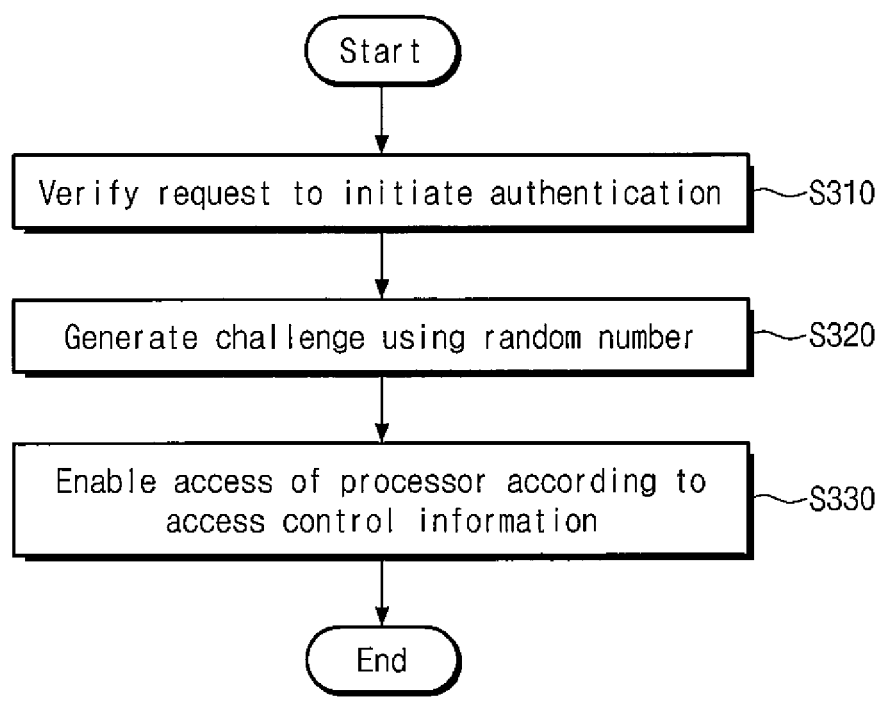
FIG. 16 is a flow chart schematically illustrating a debugging method on a device, according to an exemplary embodiment.

FIG. 16 is a flow chart schematically illustrating a debugging method on a device according to an exemplary embodiment. Now will be described a debugging method with reference to FIGS. 1 to 16.

In operation S310, a secure JTAG 110 determines whether a request to initiate authentication received from a user of the debugging device 200 is valid. When the request is determined to be valid, debugging authentication may be executed between the secure JTAG 110 and the debugging device 200 operated by the user using a challenge-response authentication procedure. In operation S320, the secure JTAG 110 generates a challenge using a random number. After debugging authentication is ended, in operation S330, an access to a JTAG port of a processor is activated according to access control information from the user of the debugging device 200 such that debugging on the processor may be performed.

The debugging method according to an exemplary embodiment may debug more stably by performing challenge-response authentication after verifying a user's request and setting a debugging environment based on access control information restricting an access authority.

Exemplary embodiments may use information, which a specific user (e.g., a user authenticated by a response server) can acquire, as a request for the progress of authentication protocol. The authentication protocol may block a non-authenticated access during its progress to prevent an attack of an aggressor.

Also, exemplary embodiments may provide a more stable debugging environment by controlling separated access rights on individual processors at a multi-processor environment.

In FIGS. 2 to 16, a secure JTAG is illustrated as including a JTAG port. However, the inventive concept is not limited thereto, and embodiments may be implemented with a secure JTAG so as to be added in a JTAG port.

Figure 17:
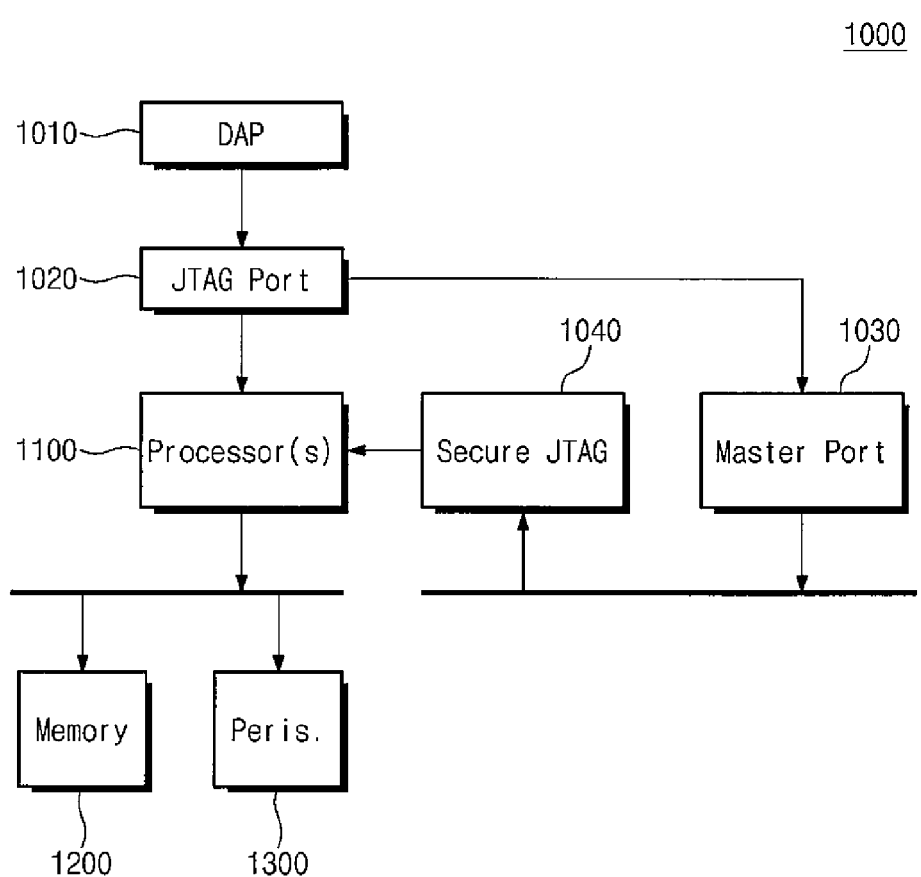
FIG. 17 is a block diagram schematically illustrating an integrated circuit according to an exemplary embodiment.

FIG. 17 is a block diagram schematically illustrating an integrated circuit according to an exemplary embodiment. Referring to FIG. 17, an integrated circuit 1000 incorporates a processor 1100, a memory 1200, a peripheral circuit 1300, a Debugging Access Port (DAP) 1010, a JTAG port 1020, a master port 1030, and a secure JTAG 1040. The processor 1100 may include a plurality of processing units. An external user debugs the integrated circuit 1000 via the DAP 1010. The JTAG port 1020 debugs internal components 1100, 1200, and 1300 of the integrated circuit 1000 via the master port 1030.

The secure JTAG 1040 uses information, which a legal user has, as a request for the progress of authentication protocol between a user and the JTAG port 1020. Also, based on access control information from the user after the authentication protocol, the secure JTAG 1040 determines whether each processing unit accesses the JTAG port 1020, whether to access the memory 1200, and whether to access the peripheral circuit 1300.

The integrated circuit 1000 according to an exemplary embodiment performs debugging safely to block a sub-channel attack.

A memory system and/or a storage device according to exemplary embodiments may be packaged according to any of a variety of different packaging technologies. Examples of such packaging technologies may include PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

While exemplary embodiments been described, it will be apparent to those skilled in the art that various changes and modifications may be made without departing from the spirit and scope of the inventive concept. Therefore, it should be understood that the above exemplary embodiments are not limiting, but illustrative.

What is claimed is:

1. A method of debugging a device which includes one or more processors, the method comprising:
   receiving, at the device, an authentication request from a debugger, the authentication request comprising request information generated by a server as a result of successful user authentication by the server, wherein the request information comprises a public key of the server;
   upon successful verification of the request information via a certificate on the public key, performing a challenge-response authentication operation between the debugger and the device, the certificate being stored at the device;
   activating or deactivating access to a Joint Test Action Group (JTAG) port of each of the one or more processors, based on access control information from the debugger; and
   permitting the debugger to perform a debugging operation when the access is activated.

2. The method of claim 1, further comprising:
   receiving a request for a device identifier (ID) from the user; and
   transmitting the device ID to the user,
   wherein the user authentication comprises authenticating a user and the device ID by the server.

3. The method of claim 1, further comprising terminating the debugging operation in response to the authentication request originating from a malicious user.

4. The method of claim 1, wherein the performing the challenge-response authentication operation comprises:
   generating a challenge using a random number; and
   transmitting the challenge to the user.

5. The method of claim 4, wherein the server receives the challenge and the access control information from the debugger, and
   wherein the server determines whether the access control information is valid, generates a response, and transmits the response to the debugger.

6. The method of claim 5, wherein the performing the challenge-response authentication operation comprises receiving, at the device, the response and the access control information from the debugger.

7. The method of claim 1, wherein the access control information indicates whether to access a bus when the debugging operation is performed.

8. The method of claim 1, wherein the access control information indicates whether to allow an input/output operation of a memory when the debugging operation is performed.

9. The method of claim 1, further comprising detecting a security attack by determining whether at least one of the authentication request, a challenge used in the challenge-response authentication operation, and a response used in the challenge-response authentication operation is changed.

10. A device comprising:
    one or more processors; and
    a debugging circuit configured to perform a debugging operation on the one or more processors according to a request from a user debugging device and by using a challenge-response authentication operation, the request comprising request information generated by a server as a result of successful user authentication by the server, wherein the request information comprises a public key of the server;
    an authentication protocol controller configured to, in response to successful verification of the request information via a certificate on the public key, perform the challenge-response authentication operation with the user debugging device, the certificate being stored at the device;
    a memory device configured to store intermediate values generated during the challenge-response authentication operation; and
    an access controller configured to generate access control signals for the one or more processors based on access control information received from the user debugging device,
    wherein access to the debugging circuit is activated or deactivated in response to the access control signals.

11. The device of claim 10, wherein the memory device is further configured to store the request.

12. The device of claim 11, further comprising:
    a cryptographic device configured to verify the request.

13. The device of claim 12, wherein the device further comprises a random number generator configured to generate a random number; and
    wherein the cryptographic device is further configured to generate a challenge to be used in the challenge-response authentication operation using the generated random number.

14. The device of claim 10, wherein the memory device is further configured to store the access control information received from the user debugging device.

15. The device of claim 10, further comprising:
    an attack detection circuit configured to detect whether the request is changed during the challenge-response authentication operation or whether a challenge or a response used in the challenge-response authentication operation is changed, and
    wherein the attack detection circuit is further configured to terminate the debugging operation in response to the attack detection circuit detecting that at least one of the request, the challenge, and the response is changed.

16. The device of claim 10, wherein the access controller is configured to generate the access control signals by decoding the access control information from the user debugging device.

17. The device of claim 16, wherein the access control information comprises at least one of processor access control information, bus access control information, memory access control information, and control information for activating/inactivating at least one function in a debugging environment.

18. An integrated circuit comprising:
one or more processors; and
a secure debugging circuit configured to perform a debugging operation by activating or deactivating access to a Joint Test Action Group (JTAG) port of each of the one or more processors based on access control information received from a user debugging device after a challenge-response authentication operation, wherein the challenge-response authentication operation is initiated by an authentication request from the user debugging device, the authentication request comprising request information generated by a server as a result of successful user authentication by the server,
wherein the request information comprises a public key of the server, and
wherein the challenge-response authentication operation is performed upon successful verification of the request information via a certificate on the public key, the certificate being stored at the integrated circuit.

19. The integrated circuit of claim 18, wherein the secure debugging circuit comprises:
an attack detection circuit configured to detect whether at least one of the authentication request, a challenge used in the challenge-response authentication operation, and a response used in the challenge-response authentication operation is changed, and
wherein the attack detection circuit is further configured to terminate the debugging operation according to a result of the detection by the attack detection circuit.

20. The integrated circuit of claim 18, wherein the integrated circuit is an application processor.

21. The method of claim 1, wherein the request information further comprises a domain parameter of an algorithm for response verification.

* * * * *